(12) United States Patent
Kouno et al.

(10) Patent No.: US 7,383,725 B2
(45) Date of Patent: Jun. 10, 2008

(54) FLOW DETECTING DEVICE HAVING HEATING ELEMENT

(75) Inventors: Yasushi Kouno, Obu (JP); Takao Ban, Toyohashi (JP); Teruaki Kaifu, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/606,055

(22) Filed: Nov. 30, 2006

(65) Prior Publication Data

US 2007/0125168 A1 Jun. 7, 2007

(30) Foreign Application Priority Data

Dec. 6, 2005 (JP) .............................. 2005-351968

(51) Int. Cl.
*G01F 1/68* (2006.01)
(52) U.S. Cl. .................................... 73/202.5
(58) Field of Classification Search ............... 73/202.5, 73/204.21, 861.52, 204.22
See application file for complete search history.

(56) References Cited

U.S. PATENT DOCUMENTS 6,684,692 B1 * 2/2004 Lenzing et al. ............ 73/202.5

7,228,734 B2 * 6/2007 Kitahara et al. ........... 73/202.5

FOREIGN PATENT DOCUMENTS

JP 08-105778 4/1996
JP 8-110256 4/1996

* cited by examiner

*Primary Examiner*—Jewel Thompson
(74) *Attorney, Agent, or Firm*—Nixon & Vanderhye PC

(57) ABSTRACT

A flow detecting device is provided to a fluid passage through which a main flow of fluid passes. The flow detecting device includes a sensor body, a heating element, a lead portion, and a guard member. The sensor body has a bypass passage through which a bypass flow is distributed partially from the main flow. The heating element is provided in the bypass passage. The lead portion connects with the heating element via a connecting portion. The heating element generates heat by being supplied with electricity via the lead portion for detecting the bypass flow in accordance with heat radiated from the heating element. The guard member is provided to an upstream of the connecting portion with respect to the bypass flow for deflecting the bypass flow from the connecting portion.

5 Claims, 5 Drawing Sheets

FLOW DETECTING DEVICE HAVING HEATING ELEMENT

CROSS REFERENCE TO RELATED APPLICATIONS

This application is based on and incorporates herein by reference Japanese Patent Application No. 2005-351968 filed on Dec. 6, 2005.

FIELD OF THE INVENTION

The present invention relates to a flow detecting device having a heating element.

BACKGROUND OF THE INVENTION

Generally, a thermal flow detecting device detects flowrate of fluid such as air in accordance with heat radiated from a heating element such as a heating resistance. The heating resistance includes a cylindrical bobbin and a pair of lead wires. The lead wires are inserted into both ends of the bobbin. The bobbin has the outer circumferential periphery around which a resistant wire is wound. The resistant wire is connected with the lead wires. The resistant wire and the lead wires are covered with a protective coat. For example, the protective coat is formed by painting or dipping glass slurry, drying the glass slurry, and subsequently, sintering the dried glass slurry. The protective coat includes an end surface coating covering an axially end surface of the bobbin. The end surface coating of the protective coat is in a substantially conical shape, and has large variation in thickness thereof such that the radially inner end thereof becomes thick and the radially outer end thereof becomes thin. Accordingly, variation in heat radiated from the heating resistance is large, and consequently, detection accuracy of the flow detecting device is low.

According to JP-A-8-110256, the axially end surface of the bobbin is in a tapered conical shape, so that variation in thickness of the protective coat is reduced around the axially end surface of the bobbin. In this structure, variation in heat radiated from the end surface of the bobbin can be reduced. Generally, the bobbin is formed of a heat resistive material such as ceramic since the bobbin needs to be resistive against high temperature generated from the heating resistance. It is costly to accurately form ceramic to be a conical shape defining the axial end surface of the bobbin.

SUMMARY OF THE INVENTION

In view of the foregoing and other problems, it is an object of the present invention to produce a flow detecting device producing enhanced detection accuracy at low cost.

According to one aspect of the present invention, a flow detecting device is provided to a fluid passage through which a main flow of fluid passes. The flow detecting device includes a sensor body that has a bypass passage through which a bypass flow is distributed partially from the main flow. The flow detecting device further includes a heating element that is provided in the bypass passage. The flow detecting device further includes at least one lead portion that supports the heating element via a connecting portion. The heating element generates heat by being supplied with electricity via the at least one lead portion for detecting the bypass flow in accordance with heat radiated from the heating element. The flow detecting device further includes a guard member that is located upstream of the connecting portion with respect to the bypass flow for deflecting the bypass flow from the connecting portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
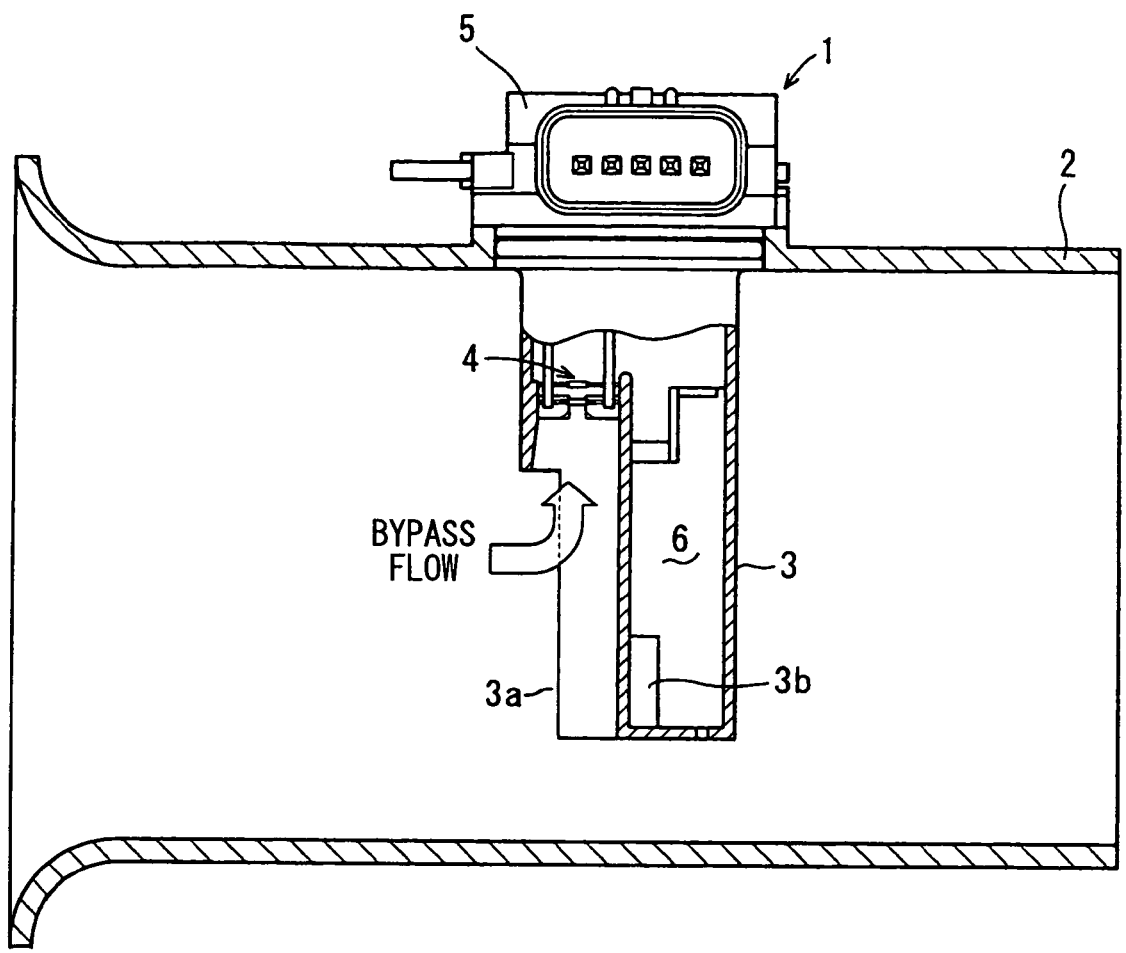
FIG. 1 is a sectional view showing a flow detecting device.

In this example, a flow detecting device 1 shown in FIG. 1 is an air flowmeter that measures flow rate of intake air drawn into in an internal combustion engine such as an automotive engine. The flow detecting device 1 is mounted detachably to an outlet pipe 2 of an air cleaner, which defines an air passage connecting with an intake port of the engine. The connection between the flow detecting device 1 and the outlet pipe 2 constructs a plug-in system (plug-in structure). The flow detecting device 1 is constructed of a sensor body 3, a sensing part 4, and a circuit module 5.

The sensor body 3 is inserted into the outlet pipe 2 through a mount hole formed in the outlet pipe 2. The sensor body 3 is inserted into the outlet pipe 2 substantially in the radial direction of the outlet pipe 2 along the vertical direction in FIG. 1.

Figure 2A:
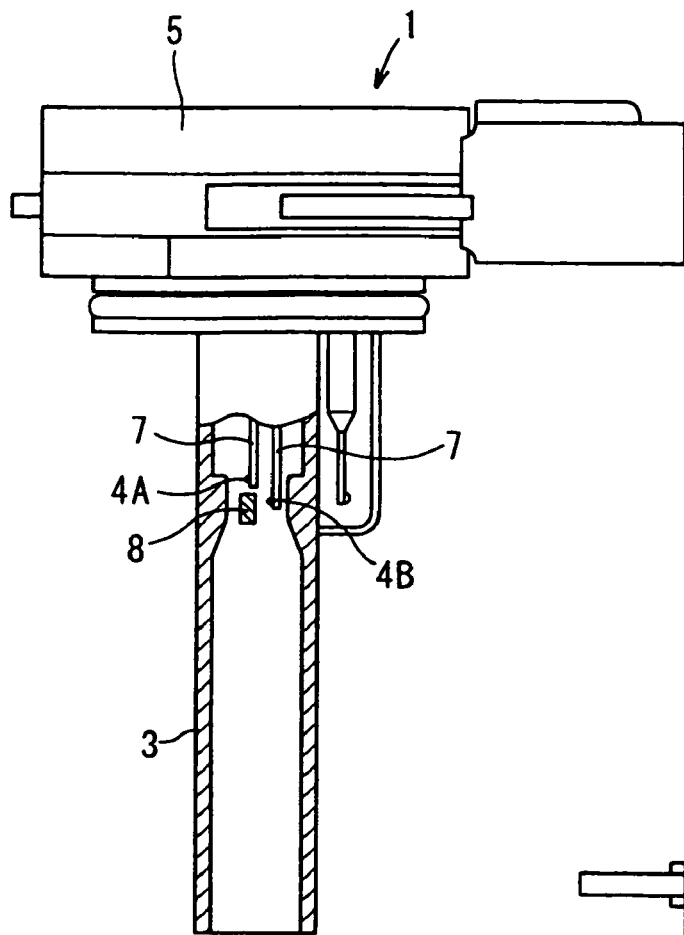
FIG. 2A is a partially sectional lateral view showing a bypass passage of the flow detecting device.
Figure 2B:
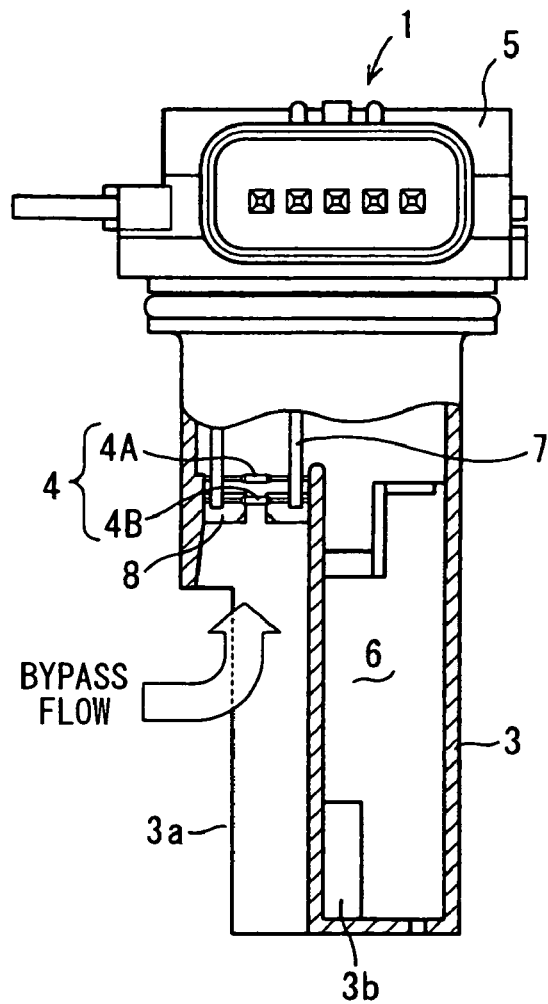
FIG. 2B is a partially sectional front view showing the bypass passage of the flow detecting device.

As shown in FIGS. 2A, 2B, a bypass passage 6 is formed in the sensor body 3 to bypass part of air (main flow) flowing through the outlet pipe 2. The sensor body 3 has an inlet 3a and an outlet 3b. The flow direction of air is changed by substantially 180° between the inlet 3a and the outlet 3b in the bypass passage 6. That is, the airflow makes U-turn in the bypass passage 6.

The sensing part 4 includes a heating resistance 4A for detecting flow rate of intake air passing through the bypass passage 6 and a temperature sensing resistance 4B for detecting air temperature in the bypass passage 6. As shown in FIG. 2B, the sensing part 4 is arranged upstream of a U-turn portion of the bypass passage 6.

Figure 3:
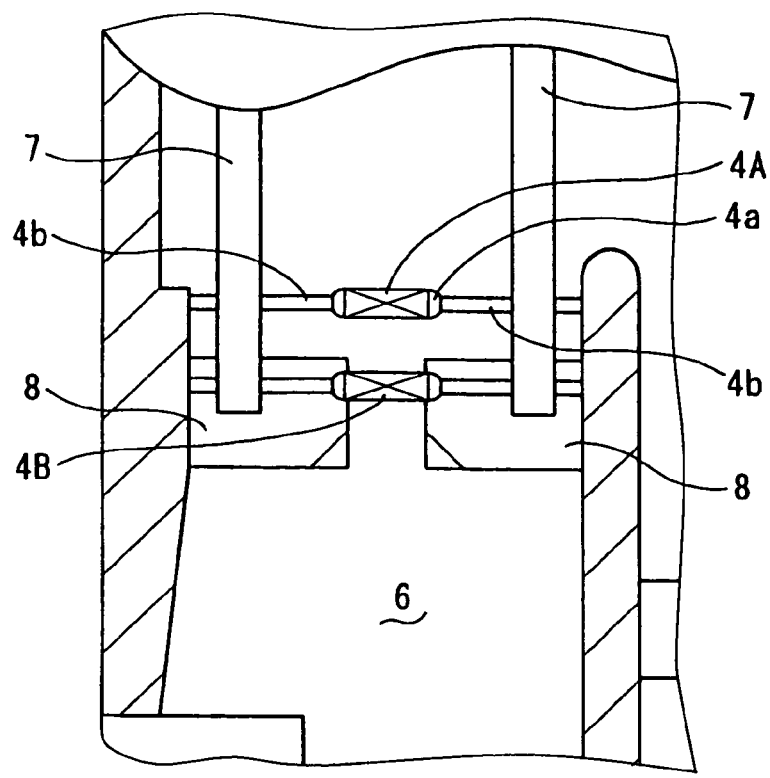
FIG. 3, is an enlarged view showing a sensing part and a guard member of the flow detecting device.

As shown in FIG. 3, the heating resistance 4A is constructed by wiring a platinum wire around the outer periphery of bobbin 4a. The platinum wire has the diameter of 0.02 mm, for example. Both ends of the heating resistance 4A connect with a pair of lead portion 4b, which are provided to both ends of the bobbin 4a. The heating resistance 4A and the lead portion 4b are at least partially covered with a protective coat.

Similarly to the heating resistance 4A, the temperature sensing resistance 4B is constructed by wiring a platinum wire around the outer periphery of a bobbin 4a, for example. Both ends of the platinum wire connect with a pair of lead portions 4b, which are provided to both ends of the bobbin 4a. Upper ends of the heating resistance 4A and the lead portion 4b are covered with a protective coat.

Each of the bobbins 4a is formed of an electrically insulative material such as aluminum oxide to be in a substantially cylindrical shape. For example, the lead portion 4b is formed of platinum to be in a bar-shape. The lead portion 4b has one end that is inserted into an inner circumferential periphery of the bobbin 4a, and fixed with glue such as high-melting point glass. The lead portion 4b has the other end that is fixed to a support pin 7 by welding or the like. The support pin 7 also serves as a terminal that electrically connects an unillustrated substrate with the lead portion 4b. The unillustrated substrate is accommodated in a circuit module 5. For example, the protective coat is formed by sintering glass coating, which includes lead oxide, in a temperature condition around 800° C.

As referred to FIG. 2A, the heating resistance 4A and the temperature sensing resistance 4B are distant from each other for a predetermined distance with respect to the thickness direction of the sensor body 3, i.e., with respect to the horizontal direction in FIG. 2A. The thickness direction of the sensor body 3 is substantially perpendicular to the flow direction of the mail flow. As shown in FIG. 2B, the temperature sensing resistance 4B is arranged on the upstream side of the heating resistance 4A. That is, the temperature sensing resistance 4B is arranged on the lower side in FIG. 2A with respect to the heating resistance 4A. Each of the heating resistance 4A and the temperature sensing resistance 4B electrically connects with the substrate via the support pins 7 (terminals), to which the lead portions 4b connect. The substrate is accommodated in the circuit module 5. The positions of the heating resistance 4A and the temperature sensing resistance 4B may be exchanged with each other.

As referred to FIG. 1, the circuit module 5 is provided to the upper end of the sensor body 3. The circuit module 5 is located outside of the outlet pipe 2. The circuit module 5 controls electricity supplied to the heating resistance 4A such that difference between temperature of the heating resistance 4A and air temperature detected using the temperature sensing resistance 4B is kept constant.

Next, guard members 8 are described.

As referred to FIGS. 2A to 3, the sensing part 4 is provided to the bypass passage 6. A pair of guard members 8 is provided to the upstream of both ends of the bobbin 4a, around which the heating resistance 4A is wound, and the lead portions 4b, which are provided to the bobbin 4a, in the bypass passage 6. The guard members 8 block part of the bypass flow of air entering into the bypass passage 6, such that the bypass flow of air may not directly collide against both the ends of the bobbing 4a and the lead portions 4b provided to the bobbin 4a. The guard members 8 may be formed of resin integrally with the sensor body 3 defining the bypass passage 6. In this construction, the guard member 8 can be provided at low cost. Next, an operation of the flow detecting device 1 is described.

The engine is started, and the main flow of air is generated in the outlet pipe 2, so that the main flow partially enters into the bypass passage 6 of the sensor body 3. As speed of the bypass flow increases around the sensing part 4 provided to the bypass passage 6, heat radiated from the heating resistance 4A becomes large. In this condition, electricity supplied to the heating resistance 4A is increased to constantly maintain difference between temperature of the heating resistance 4A and air temperature detected using the temperature sensing resistance 4B. On the contrary, as speed of the bypass flow decreases, heat radiated from the heating resistance 4A becomes small, so that electricity supplied to the heating resistance 4A is decreased. The circuit module 5 outputs an electric signal such as voltage signal to an external electronic control unit (ECU) corresponding to the electricity supplied to the heating resistance 4A. The ECU measures the intake amount in accordance with the electric signal.

Figure 4:
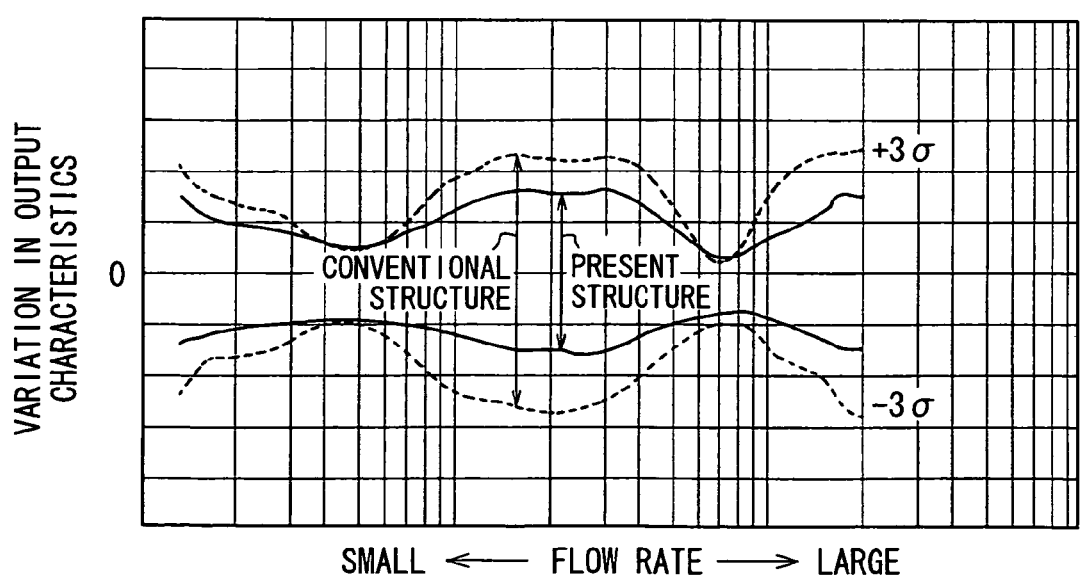
FIG. 4 is a graph showing a relationship between variation in output characteristics of the flow detecting device and flow rate.
Figure 5:
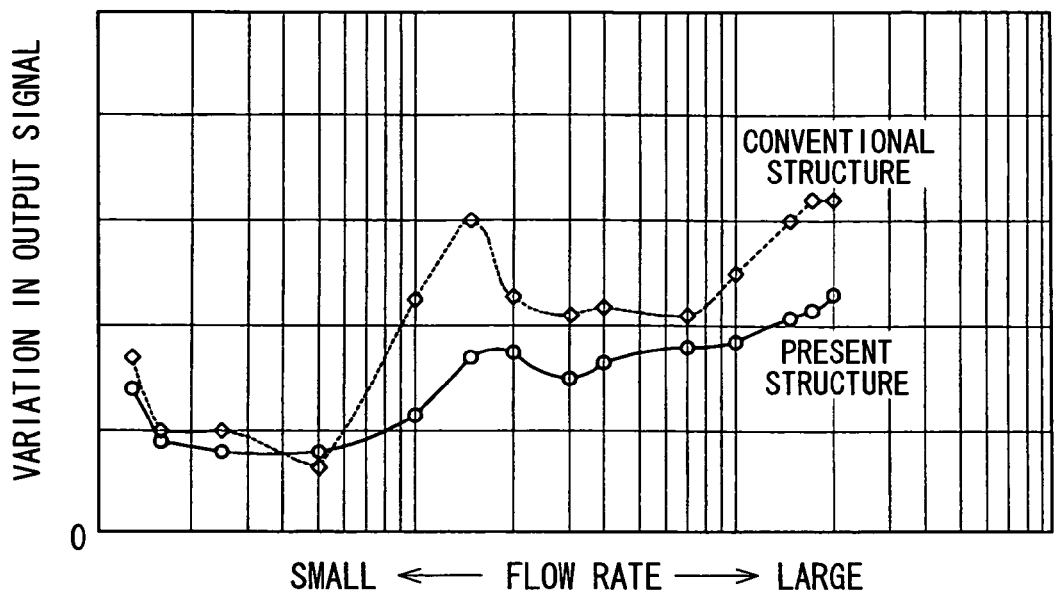
FIG. 5 is a graph showing a relationship between variation in output signal of the flow detecting device and flow rate.

In this example, the flow detecting device 1 includes the guard members 8 that are provided to the upstream of both ends of the bobbin 4a and the lead portions 4b. The heating resistance 4A is wound around the bobbin 4a. The lead portions 4b are provided to the bobbin 4a. In this structure, the guard members 8 block part of air flowing into the bypass passage 6, so that speed of air, which collides against both ends of the bobbin 4a and the lead portions 4b, can be significantly reduced. Therefore heat radiated from both ends of the bobbin 4a can be reduced relative to total heat radiated from the heating resistance 4A. Thus, variation in total heat radiated from the heating resistance 4A can be restricted, even when variation in thickness of the protective coat covering both ends of the bobbin 4a is large, and consequently, variation in heat radiated from both ends of the bobbin 4a is large. As a result, as shown in FIG. 4, variation in output characteristics of the flow detecting device 1 having the present structure can be reduced compared with a flow detecting device having a conventional structure, in which the guard members 8 are not provided. In addition, as shown in FIG. 5, variation in output signal of the flow detecting device 1 having the present structure can be reduced compared with a flow detecting device having a conventional structure, in which the guard members 8 are not provided, relative to the flow rate of intake air. Thus, detection accuracy of intake air can be enhanced.

Furthermore, the guard members 8 are provided entirely to the upstream of the lead portions 4b, in addition to both ends of the bobbing 4a to which the lead portions 4b respectively connect. Therefore, the lead portions 4b can be protected from foreign matters such as carbon and moisture contained in intake air.

Figure 6A:
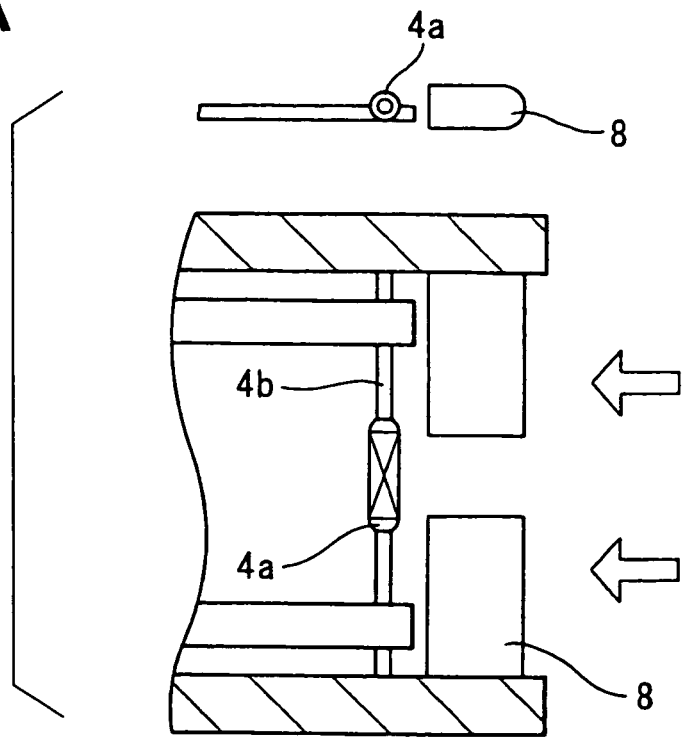
FIG. 6A is a schematic view showing the sensing part and the guard member of the flow detecting device.
Figure 6B:
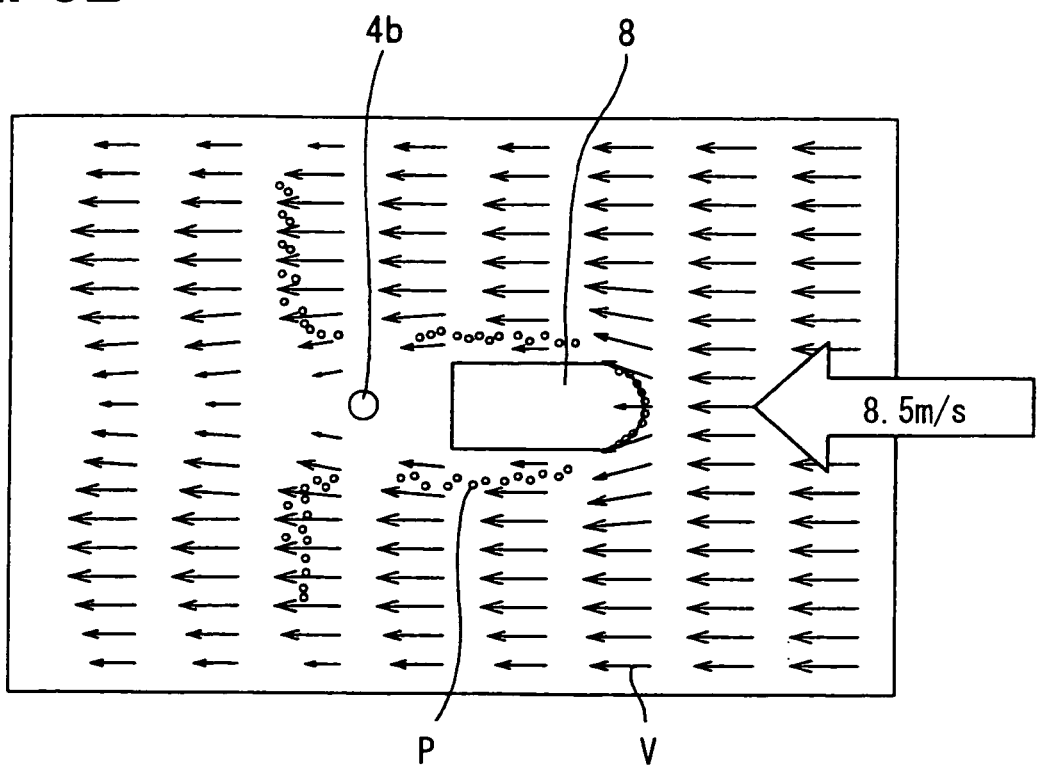
FIG. 6B is a view showing a result of an analysis for simulating flow containing foreign matters in the flow detecting device.

FIGS. 6A, 6B depict a result of a CAE analysis for simulating a product of the flow detecting device 1. In FIG. 6B, each arrow V indicates a velocity of airflow, and the length of each arrow V indicates speed of airflow. P denotes a foreign matter being in substantially 1 μm in outer diameter.

According to this analysis, speed of airflow significantly decreases in the downstream of the guard member 8 compared with the upstream and the lateral side of the guard member 8. Thus, foreign matters flow along intake air passing at high speed around the guard member 8, so that foreign matters can be restricted from entering into the downstream of the guard member 8. Consequently, the lead portions 4b downstream of the guard members 8 can be protected from foreign matters.

Temperature of the heating resistance 4A is about 200° C. higher than temperature of intake air, so that moisture adhering to the heating resistance 4A is apt to evaporate. When foreign matters adhere on the bobbin 4a, around which the heating resistance 4A is wound, the foreign matters may be removed accompanied by moisture evaporating from the heating resistance 4A. In addition, foreign matters adhering to the heating resistance 4A may drop accompanied by vibration of engine and vehicle.

Figure 7:
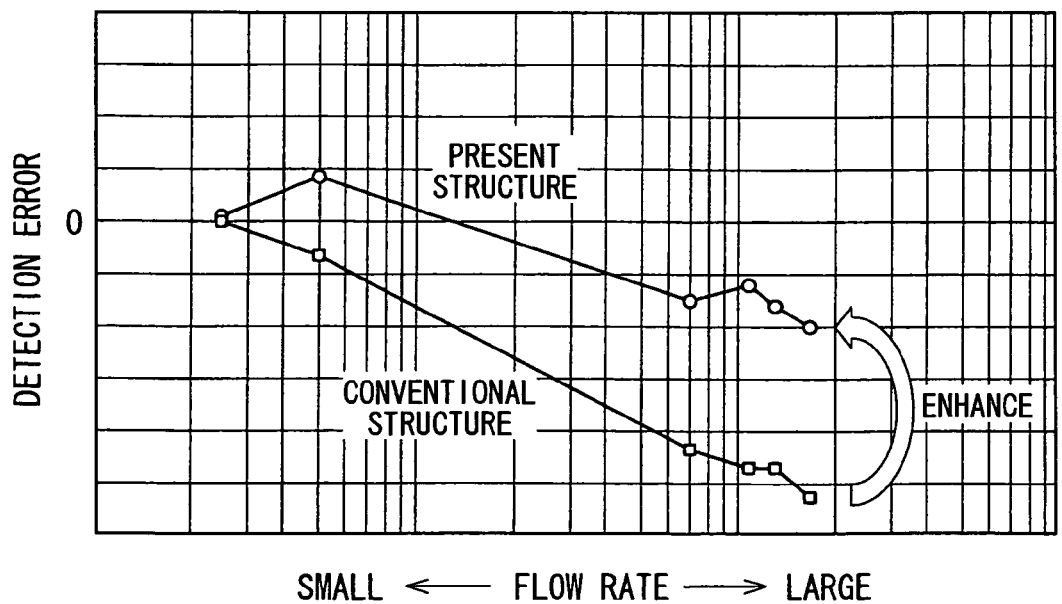
FIG. 7 is a graph showing a relationship between detection error of the flow detecting device and flow rate.

On the contrary, temperature of the one end of the lead portion 4b connecting with the bobbin 4a is high, and temperature of the other end of the lead portion 4b supported by the support pin 7 is low. Average temperature of the lead portion 4b is significantly lower than the temperature of the heating resistance 4A due to thermal gradient in the entire lead portion 4b. When foreign matters adhere to the lead portion 4b, heat radiated from the lead portion 4b significantly decreases, and consequently, error may be caused in detection of the intake air. On the contrary, in this example, the guard members 8 reduce foreign matters adhering to the lead portions 4b in the flow detecting device 1. Thus, the guard members 8 are capable of reducing adherents from the lead portions 4b, thereby protecting the lead portions 4b from aging. Thus, heat radiated from the lead portions 4b can be maintained. In FIG. 7, as the flow rate of intake air increases, detection error of intake air flow in the flow detecting device 1 having the present structure can be significantly reduced compared with a flow detecting device having a conventional structure, in which the guard members 8 are not provided. Thus, detection accuracy of the intake air can be significantly enhanced.

Modification

The guard member 8 may be provided separately from the sensor body 3. The guard member 8 may be provided to an end of the support pin 7 supporting the lead portion 4b. In this structure, alignment of the guard member 8 can be marinated relative to the lead portion 4b via the support pin 7, so that the guard member 8 can be accurately positioned relative to the sensing part 4.

The flow detecting device 1 may be applied to various devices other than the outlet pipe 2. The flow detecting device 1 may be applied to a throttle body.

The fluid applied with the flow detecting device 1 is not limited to air. The flow detecting device 1 may be applied to fluid such as vapor containing foreign matters other than air.

Various modifications and alternations may be diversely made to the above embodiments without departing from the spirit of the present invention.

What is claimed is:

1. A flow detecting device that is provided to a fluid passage through which a main flow of fluid passes, the flow detecting device comprising:
    a sensor body that has a bypass passage through which a bypass flow is distributed partially from the main flow;
    a heating element that is provided in the bypass passage;
    at least one lead portion that supports the heating element via a connecting portion, the heating element generating heat by being supplied with electricity via the at least one lead portion for detecting the bypass flow in accordance with heat radiated from the heating element; and
    a guard member that is located upstream of the connecting portion with respect to the bypass flow for deflecting the bypass flow from the connecting portion,
    wherein the guard member is integrated with the sensor body.

2. The flow detecting device according to claim 1, wherein the guard member is located upstream of the at least one lead portion with respect to the bypass flow.

3. The flow detecting device according to claim 1, wherein the heating element includes a heating resistance and a bobbin,
    the bobbin is electrically insulative,
    the heating resistance is provided around an outer circumferential periphery of the bobbin,
    the at least one lead portion includes a pair of lead portions each provided to each end of the bobbin and connecting with the heating resistance,
    the heating element and each lead portion are at least partially covered with a protective coat, and
    the guard member is located upstream of the pair of lead portions and each end of the bobbin.

4. The flow detecting device according to claim 1, wherein the fluid passage is an intake passage connecting with an intake port of an internal combustion engine, and
    the main flow passes is introduced into the internal combustion engine through the intake passage.

5. A flow detecting device that is provided to a fluid passage through which a main flow of fluid passes, the flow detecting device comprising:
    a sensor body that has a bypass passage through which a bypass flow is distributed partially from the main flow;
    a heating element that is provided in the bypass passage;
    at least one lead portion that connects with the heating element via a connecting portion, the heating element generating heat by being supplied with electricity via the at least one lead portion;
    a circuit that detects the bypass flow in accordance with heat radiated from the heating element; and
    a guard member that is provided to an upstream of the connecting portion with respect to the bypass flow for deflecting the bypass flow from the connecting portions,
    wherein the guard member is integrated with the sensor body.

* * * * *